United States Patent
Zeng et al.

(10) Patent No.: US 7,376,643 B2
(45) Date of Patent: May 20, 2008

(54) METHOD AND SYSTEM FOR DETERMINING SIMILARITY OF OBJECTS BASED ON HETEROGENEOUS RELATIONSHIPS

(75) Inventors: Hua-Jun Zeng, Beijing (CN); Gui-Rong Xue, Beijing (CN); Zheng Chen, Beijing (CN); Benya Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 10/846,949

(22) Filed: May 14, 2004

(65) Prior Publication Data

US 2005/0256833 A1 Nov. 17, 2005

(51) Int. Cl.
*G06F 17/00* (2006.01)
(52) U.S. Cl. .................... 707/3; 707/1; 707/2
(58) Field of Classification Search .......... 707/1, 707/2, 3
See application file for complete search history.

(56) References Cited

U.S. PATENT DOCUMENTS

2004/0002973 A1 1/2004 Chaudhuri et al.

OTHER PUBLICATIONS

Wang, Jidong et al., "ReCoM: Reinforcement Clustering of Multi-Type Interrelated Data Objects", ACM: 2003, pp. 274-281.*
Wen, Ji-Rong et al., "Query Clustering Using User Logs", AMC: 2002, pp. 59-81. (Provided by Applicant).*
Theobald, Martin and Klas, Claus-Peter, "Bingo! and Daffodil: Personalized Exploration of Digital Libraries and Web Sources," Proceedings of the Conference on Coupling Approaches, Coupling Media and Coupling Languages for Information Retrieval, Online! Apr. 26, 2004 (19 pages).
Baeza-Yates, Ricardo et al., "Web Structure, Dynamics and Page Quality," Lecture Notes in Computer Science, Proceedings of the 9th International Symposium on String Processing and Information Retrieval, vol. 2476, Sep. 2002 (14 pages).
Tomlin, John A., "A New Paradigm for Ranking Pages on the World Wide Web," Proceedings of the International World Wide Web Conference, Online! May 20, 2003, Budapest, Hungary ( 6 pages).
Kerschberg, Larry, "A Semantic Taxonomy-Based Personalized Meta-Search Agent," Proceedings of the Second International Conference on Web Information Systems Engineering, Online!, vol. 1, Dec. 3, 2001, Kyoto, Japan (10 pages).

(Continued)

*Primary Examiner*—Charles Rones
*Assistant Examiner*—Phuong-Thao Cao
(74) *Attorney, Agent, or Firm*—Perkins Coie LLP

(57) ABSTRACT

A method and system for measuring the similarity of objects based on relationships with objects of the same type and different types and similarities of those objects to other objects is provided. In one embodiment, the similarity system defines intra-type and inter-type similarity functions for each type of object. The similarity system may combine the intra-type and inter-type similarity functions for a certain type into an overall similarity function for that type. After defining the similarity functions, the similarity system collects attribute values for the objects, which may include relationship data between objects of the same type, referred to as intra-type relationships, and relationships between objects of different types, referred to as inter-type relationships. After collecting the attribute values for the objects, the similarity system solves the intra-type and inter-type similarity functions by iteratively calculating the similarities for the objects until the similarities converge on a solution.

31 Claims, 5 Drawing Sheets

OTHER PUBLICATIONS

Miller, Joel C., et al:, "Modifications of Kleinberg's HITS Algorithm Using Matrix Exponentiation and Web Log Records," Proceedings of the 24th Annual International ACM SIGIR Conference on Research and Development in Information Retrieval, Online!, Sep. 9, 2001 (2 pages).

Wen, Ji-Rong et al., "Query Clustering Using User Logs," ACM Transactions on Information Systems, Association for Computing Machinery, New York, vol. 20, No. 1, Jan. 2002 (23 pages).

Bharat, Krishna and Henzinger, Monika, "Improved Algorithms for Topic Distillation in a Hyperlinked Environment," SIGIR '98, Proceedings of the 21st Annual International ACM-SIGIR Conference on Research and Development in Information Retrieval, Melbourne, Aug. 24-28, 1998 (9 pages).

Wang, Ke and Su, Ming-Yen Thomas, "Item Selection by 'Hub-Authority' Profit Ranking," Proceedings of the 8th ACM SIGKDD International Conference on Knowledge Discovery and Data Mining, Online! Jul. 23, 2002 (6 pages).

Haveliwala, Taher, "Topic-Sensitive PageRank: A Context-Sensitive Ranking Algorithm for Web Search," IEEE Transactions on Knowledge and Data Engineering, Online!, Aug. 2003 (13 pages).

European Search Report for European Patent Application No. 05104021.0, Sep. 22, 2005 (5 pages).

* cited by examiner

METHOD AND SYSTEM FOR DETERMINING SIMILARITY OF OBJECTS BASED ON HETEROGENEOUS RELATIONSHIPS

TECHNICAL FIELD

The described technology relates generally to determining the similarity of objects and particularly to determining the similarity based on object relationships.

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, a search engine service may maintain a mapping of keywords to web pages. The search engine service may generate this mapping by "crawling" the web (i.e., the World Wide Web) to extract the keywords of each web page. To crawl the web, a search engine service may use a list of root web pages and identify all web pages that are accessible through those root web pages. The keywords of any particular web page can be extracted using various well-known information retrieval techniques, such as identifying the words of a headline, the words supplied in the metadata of the web page, the words that are highlighted, and so on. The search engine service may calculate a relevance score that indicates how relevant each web page is to the search request based on the closeness of each match, web page popularity (e.g., Google's PageRank), and so on. The search engine service then displays to the user the links to those web pages in an order that is based on their relevance. Search engines may more generally provide searching for information in any collection of documents. For example, the collections of documents could include all U.S. patents, all federal court opinions, all archived documents of a company, and so on.

The search engine services may need to measure the similarity between various objects such as web pages or queries. For example, a search engine service may allow for interactive query expansion, which requires a similarity calculation between query terms and other terms. As another example, a search engine service may want to group web pages into clusters of similar web pages to assist a user in navigating through the web pages. Typical algorithms for determining the similarity of objects generally use a feature vector relating to the objects and then calculate the distance between the feature vectors as an indication of similarity. For example, web pages may have features that include keywords, content, and so on that are used to calculate the similarity. Most algorithms rely solely on the features associated with the objects when determining similarity. For example, the similarity between web pages may be based solely on the content of the web pages. A few algorithms, however, factor in features that are based on heterogeneous objects. For example, one algorithm uses click-through data in which queries are similar if they contain the same terms or lead to selection of the same web page by users. Thus, the feature vector for such queries would include information on web pages of the query result that were selected by users.

These techniques, however, when calculating the similarity between objects of a type fail to take into consideration the similarity among objects of another type that may be related. That is, the similarity measurements for objects of a type may be related to the similarity measurements for objects of another type. For example, a query may be similar to another query based, in part, on the similarity between the web pages of the results which users select or click through. Conversely, web pages may be similar to another based, in part, on the similarity between the queries that return the web pages in their results. It would be desirable to have a technique for measuring the similarity of objects that factors in relationships between heterogeneous objects.

SUMMARY

A method and system for measuring the similarity of objects based on relationships with objects of the same type and different types and similarities of those objects to other objects is provided. In one embodiment, the similarity system defines intra-type and inter-type similarity functions for each type of object. The similarity system may combine the intra-type and inter-type similarity functions for a certain type into an overall similarity function for that type. After defining the similarity functions, the similarity system collects attribute values for the objects, which may include relationship data between objects of the same type, referred to as intra-type relationships, and relationships between objects of different types, referred to as inter-type relationships. After collecting the attribute values for the objects, the similarity system solves the intra-type and inter-type similarity functions by iteratively calculating the similarities for the objects until the similarities converge on a solution.

DETAILED DESCRIPTION

Figure 1:
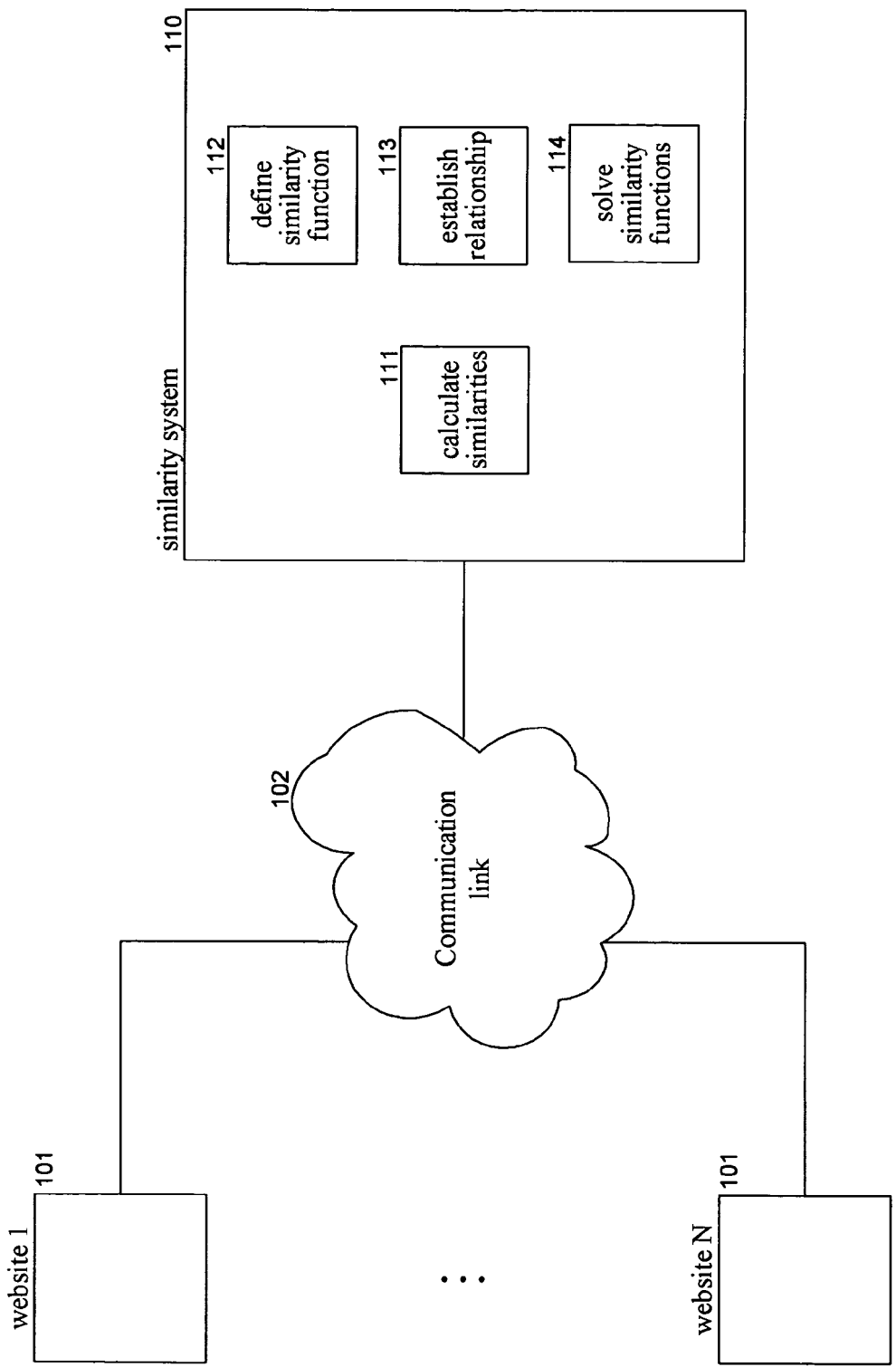
FIG. 1 is a block diagram that illustrates components of the similarity system in one embodiment.

A method and system for measuring the similarity of objects based on relationships with objects of the same type and different types and similarities of those objects to other objects is provided. In one embodiment, the similarity system defines intra-type and inter-type similarity functions for each type of object. An intra-type similarity function measures the similarity between objects of the same type. For example, an intra-type similarity function between queries may be based on how closely the search terms of the queries match up based on an attribute of the users who submit the queries. An intra-type similarity between objects may also be dependent on the similarity of other objects of the same type. For example, two queries may be more similar to each other if they each have a high similarity to a third query. Such intra-type similarity between objects that is based on the similarity between other objects defines a recursive function. An inter-type similarity function measures the similarity between two objects of one type based on attributes, including similarity, of objects of another type. For example, two queries may be more similar if a web page of one query's result that users click through is similar to a web page of the other query's result that users click through. The similarity of the objects of the other type may also be dependent on the similarity to the objects of the one type. Moreover, since the similarity of objects of one type can be dependent on the similarity of objects of another type, and vice versa, the inter-type similarity functions are recursive between different types.

A type of object may have various similarity definitions defined for its objects based on different attributes of the objects. For example, a web page may have an intra-type similarity that is based on the content of the web pages and another intra-type similarity based on links between web pages. The similarity system may combine the intra-type and inter-type similarity functions for a certain type into an overall similarity function for that type. In one embodiment, the similarity system combines the intra-type and inter-type similarity functions by a linear equation with weights applied to each intra-type and inter-type similarity function based on its perceived accuracy in representing the overall similarity between objects of that type. For example, an intra-type similarity function with high accuracy may be given a high weight, and an intra-type similarity function with low accuracy may be given a low weight.

After defining the similarity functions, the similarity system collects attribute values for the objects, which may include relationship data between objects of the same type, referred to as intra-type relationships, and relationships between objects of different types, referred to as inter-type relationships. For example, a web page may have non-relationship-based attribute values corresponding to the keywords of the web page. A web page may also have an intra-type relationship based on incoming and outgoing links between web pages. A web page may have an inter-type relationship with queries based on click throughs from query results to web pages.

After collecting the attribute values for the objects, the similarity system solves the intra-type and inter-type similarity functions by iteratively calculating the similarities for the objects until the similarities converge on a solution. The similarity system uses an iterative approach because of the recursive nature of the similarity functions. The similarity system starts off with the similarities initialized and then calculates the similarity function for each type of object based on the initial similarities to give new similarities. The similarity system measures the difference between the new similarities and the old similarities to determine if the similarities have converged on a solution. If so, the new similarities represent the solution. If not, the similarity system repeats the process with the new similarities becoming the old similarities. The similarity system thus calculates the similarities of objects of one type based on the similarities of objects of another type and based on relationships between the objects of the different types.

In the following, an example of the processing of the similarity system in the context of a search engine is provided. The similarity system models objects (e.g., web pages and queries) and relationships (e.g., incoming links and click throughs) used by a search engine as a directed graph $G=(V, E)$ where nodes V represent objects of the search engine and edges E represent relationships between the objects. The nodes V can be divided into two subsets $Q=\{q^1, q^2, \ldots q^m\}$ and $P=\{p^1, p^2, \ldots, p^n\}$ where Q represents the queries and P represents the web pages. The relationships among these web pages and queries may include an incoming link relationship (IL), an outgoing link relationship (OL), and a click-through relationship (CT). For a node v in a graph, $M_R$ (v) represents the set of the adjacent nodes that have the relationship R with node v. For example, $M_{IL}$ (v) represents the set of the web pages that are the source of incoming links to web page v. $M_R^i$ (v) denotes the $i^{th}$ web page in the set. The similarity system uses a similarity matrix S to represent the similarity between objects, and S[a, b] represents the similarity between the objects a and b.

The similarity system is based on a principle that objects of one type are similar based, in part, on the similarity of interrelated objects of another type. If two objects of one type have a relationship with the same object of another type, then the two objects are similar to an extent. Also, if two objects of the same type have a relationship to two different, but similar, objects of another type, then the two objects are similar to an extent. The similarity system represents this principle with the following equations:

$$S_{O_1}[a, b] = \frac{C}{|M_R(a)||M_R(b)|} \sum_{i=1}^{|M_g(a)|} \sum_{j=1}^{|M_g(b)|} S_{O_2}[M_R^i(a), M_R^j(b)] \quad (1)$$

where $S_{O_1}$ represents the similarity between objects a and b of type $O_1$, $S_{O_2}$ represents the similarity between objects i and j of another type, R represents the inter-type relationship that the similarity is based on, and C is a weight factor. If a is equal to b, then $S_{O_1}$ [a,b] is defined to be 1, that is, the similarity between an object and itself defines the maximal similarity of 1. If a and b are both related to the same object A in $O_2$, then $S_{O_2}$ [A,A] is 1, which gives the maximum contribution to $S_{O_1}$ [a, b]. If either a or b does not have any neighbors, that is, no relationship to an object in $O_2$, then $|M_R(a)|$ or $|M_R(b)|$ would be equal to zero. In such a case, the similarity system sets $S_{O_1}$ [a,b] to zero, preventing division by zero. As an example, assume that $O_1$ contains objects a and b, that $O_2$ contains objects A, B, and C, and that a is related to A and B and b is related to B and C. If $S_{O_1}$ [A,B] is 0.7, $S_{O_1}$ [B,C] is 0.7, and $S_{O_1}$ [B,C] is 0.49 and the weighting factor is 0.7, then, by applying Equation 1, $S_{O_1}$ [a,b] is 0.5 (e.g., 0.7/4*(0.7+0.49+1.0+0.7)).

The similarity system defines the overall similarity of a type of objects based on a combination of similarities derived from the intra-type similarity functions and the inter-type similarity functions. In one embodiment, the similarity system uses a linear combination of the similarities of the intra-type similarity functions and the inter-type similarity functions as represented by the following equation:

$$S[a, b] = \alpha S_{intra}[a, b] + \beta S_{inter}[a, b] \quad (2)$$

where $S_{intra}$ and $S_{inter}$ represent the similarities derived from intra-type similarity functions and the inter-type similarity functions and $\alpha$ and $\beta$ are weights for the similarities with $\alpha+\beta=1$. By assigning different values to $\alpha$ and $\beta$, the similarity system can adjust the contributions of different similarity functions to the overall similarity. As described above, Equation 2 can be defined recursively since the similarity of one object can be defined based on the similarity of another object, which can be in turn defined based on the similarity of the one object. In one embodiment, the similarity system solves the similarity functions iteratively by calculating the similarities until they converge (i.e., $\|S^i - S^{i-1}\| < \epsilon$, where $\epsilon$ is a difference threshold).

In the search engine context, the similarity system may use only the content of a query to define the intra-type similarity function. The intra-type similarity function based on content may be defined by the following equation:

$$S_{QC}[a, b] = \frac{|\text{Keyword}(a) \cap \text{Keyword}(b)|}{|\text{Keyword}(a) \cup \text{Keyword}(b)|} \quad (3)$$

where a and b are queries and $S_{QC}$ is the content similarity matrix of the queries based on content. As an example, when queries a and b have two search terms (or keywords) with one keyword in common, then their similarity value would be 0.33 (i.e., ⅓). The similarity system may define the inter-type similarity function for a query based on a click-through relationship to web pages by the following equation:

$$S_{QCT}[a, b] = \frac{C_{CT}}{|M_{CT}(a)||M_{CT}(b)|} \sum_{i=1}^{|M_{CT}(a)|} \sum_{j=1}^{|M_{CT}(b)|} S_{PCT}[M_{CT}^i(a), M_{CT}^j(b)] \quad (4)$$

where $S_{QCT}$ represents the similarity matrix of the queries based on click throughs, $S_{PCT}$ represents the similarity matrix of the web pages based on click throughs, $M_{CT}(a)$ represents the click throughs from query a to web pages that are identified from query logs, and $C_{CT}$ is a weighting factor. The similarity system combines Equations (3) and (4) into an overall similarity function for queries that is represented by the following equation:

$$S_Q[a, b] = \alpha S_{QC}[a, b] + \beta S_{QCT}[a, b] \quad (5)$$

where $S_Q$ represents the overall similarity matrix of the queries.

The similarity system represents the similarity of web pages based on intra-type relationships of incoming links and outgoing links and an inter-type relationship with queries that result in click throughs to the web pages. The similarity system defines an intra-type similarity function based on an incoming link relationship to reflect that two web pages may be similar when they are linked to by the same web page (or similar web pages). The similarity system also defines an inter-type similarity function based on an outgoing link relationship to reflect that two web pages may be similar when they link to the same web page (or to similar web pages). The similarity system represents the intra-type similarity functions for web pages based on outgoing and incoming link relationships by the following equations:

$$S_{OL}[A, B] = \frac{C_{OL}}{|M_{OL}(A)||M_{OL}(B)|} \sum_{i=1}^{|M_{OL}(A)|} \sum_{j=1}^{|M_{OL}(B)|} S_{IL}[M_{OL}^i(A), M_{OL}^j(B)] \quad (6)$$

$$S_{IL}[A, B] = \frac{C_{IL}}{|M_{IL}(A)||M_{IL}(B)|} \sum_{i=1}^{|M_{IL}(A)|} \sum_{j=1}^{|M_{IL}(B)|} S_{IL}[M_{IL}^i(A), M_{IL}^j(B)] \quad (7)$$

where A and B represent web pages, $C_{OL}$ and $C_{IL}$ represent the weighting factors, $S_{OL}$ and $S_{IL}$ are the similarity matrices based on outgoing and incoming links, $M_{OL}$ (A) represents the destination web pages of outgoing links from web page A, and $M_{IL}$ (A) represents the source of the web pages of the incoming links to web page A. The similarity system represents the inter-type similarity function for web pages based on the click-through relationship by the following equation:

$$S_{PCT}[A, B] = \frac{C_{CT}}{|M_{CT}(A)||M_{CT}(B)|} \sum_{i=1}^{|M_{CT}(A)|} \sum_{j=1}^{|M_{CT}(B)|} S_{QCT}[M_{CT}^i(A), M_{CT}^j(B)] \quad (8)$$

where $M_{CT}(A)$ represents the queries that users click through to access web page A. Since Equation 8 is defined in terms of Equation 4 (i.e., $S_{QCT}$), and vice versa, the pair of equations defines a recursive function. The similarity system defines the overall similarity function for web pages as the linear combination of the intra-type similarity functions and the inter-type similarity functions, which is represented by the following equation:

$$S_P[A, B] = \alpha' S_{OL}[A, B] + \beta' S_{IL}[A, B] + \gamma' S_{PCT}[A, B] \quad (9)$$

where $S_P$ represents the similarity matrix for web pages, and $\alpha'$, $\beta'$, and $\gamma'$ are weights where $\alpha' + \beta' + \gamma' = 1$.

The similarity system thus uses a unified framework to integrate heterogeneous objects and their inter-type relationships. Since the overall similarity functions are recursive, the similarity system solves the similarity functions simultaneously and iteratively. The similarity functions are represented by the following equations:

$$S_{QC}[a, b] = \frac{\text{Keyword}(a) \cap \text{Keyword}(b)}{\text{Keyword}(a) \cup \text{Keyword}(b)} \quad (10)$$

$$S_{QCT}[a, b] =$$
$$\frac{C_{CT}}{|M_{CT}(a)||M_{CT}(b)|} \sum_{i=1}^{|M_{CT}(a)|} \sum_{j=1}^{|M_{CT}(b)|} S_P[M_{CL}^i(a), M_{CL}^j(b)]$$

$$S_Q[a, b] = \alpha S_{QC}[a, b] + \beta S_{QCT}[a, b]$$

$$S_{OL}[A, B] =$$
$$\frac{C_{PC}}{|M_{OL}(A)||M_{OL}(B)|} \sum_{i=1}^{|M_{OL}(A)|} \sum_{j=1}^{|M_{OL}(B)|} S_P[M_{OL}^i(A), M_{OL}^j(B)]$$

$$S_{IL}[A, B] = \frac{C_{PR}}{|M_{IL}(A)||M_{IL}(B)|} \sum_{i=1}^{|M_{IL}(A)|} \sum_{j=1}^{|M_{IL}(B)|} S_P[M_{IL}^i(A), M_{IL}^j(B)]$$

$$S_{PCT}[A, B] =$$
$$\frac{C_{CT}}{|M_{CT}(A)||M_{CT}(B)|} \sum_{i=1}^{|M_{CT}(A)|} \sum_{j=1}^{|M_{CT}(B)|} S_Q[M_{CT}^i(A), M_{CT}^j(B)]$$

$$S_P[A, B] = \alpha' S_{OL}[A, B] + \beta' S_{IL}[A, B] + \gamma' S_{PCT}[A, B]$$

as defined above. As can be seen in Equations 10, the inter-type similarity between any two queries is affected by the similarity of web pages, both intra-type and inter-type similarity. Since the inter-type similarity between web pages is affected by the similarity of queries, both intra-type and inter-type, Equations 10 define recursive relationships. Thus, the similarities of web pages and queries mutually spread to each other and converge to a stable state.

FIG. 1 is a block diagram that illustrates components of the similarity system in one embodiment. Web sites 101 are connected via communications link 102 to the similarity system 110. The similarity system includes a calculate similarities component 111, a define similarity functions component 112, an establish relationships component 113, and a solve similarity functions component 114. The calculate similarities component calculates the similarities between objects based on inter-type relationships and similarities of other types of objects. The calculate similarities component invokes the define similarity functions component, the establish relationships component, and the solve similarity functions component. The define similarity functions component may interact with a user to define the types of objects, the relationships between the objects, and the various similarity functions for each type of object. The establish relationships component generates the relationship data based on collected data. For example, the collected data may include queries, web pages of the query results, and query logs. The solve similarity functions component iteratively calculates the defined similarity functions to generate updated similarity matrices until the similarities of the similarity matrices converge on a solution.

The computing device on which the similarity system is implemented may include a central processing unit, memory, input devices (e.g., keyboard and pointing devices), output devices (e.g., display devices), and storage devices (e.g., disk drives). The memory and storage devices are computer-readable media that may contain instructions that implement the similarity system. In addition, the data structures and message structures may be stored or transmitted via a data transmission medium, such as a signal on a communications link. Various communications links may be used, such as the Internet, a local area network, a wide area network, or a point-to-point dial-up connection.

The similarity system may be implemented in various operating environments. Various well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The similarity system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
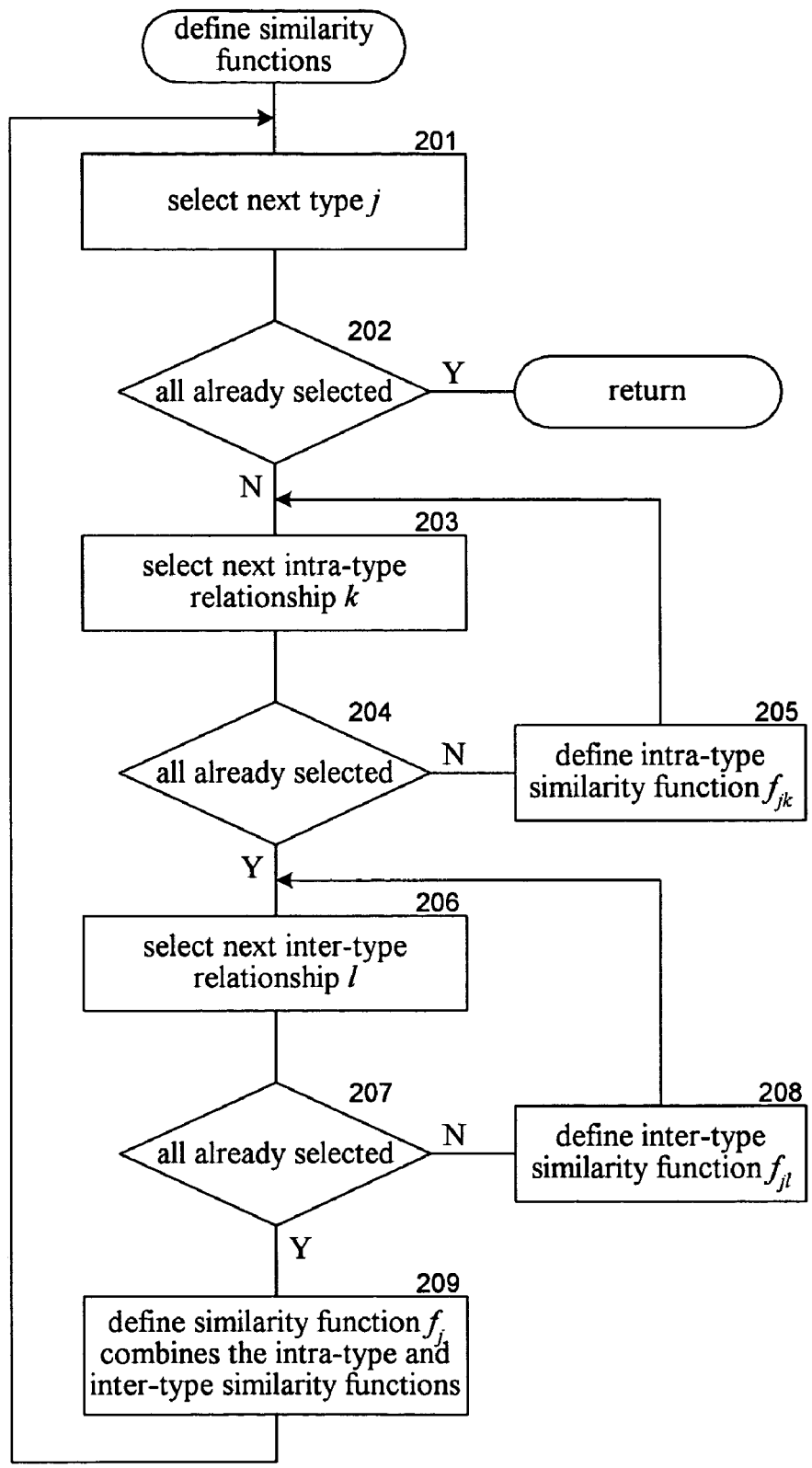
FIG. 2 is a flow diagram that illustrates the processing of the define similarity functions component in one embodiment.

FIG. 2 is a flow diagram that illustrates the processing of the define similarity functions component in one embodiment. In blocks 201-209, the component loops selecting each type of object and defining intra-type and inter-type similarity functions for objects of that type. In one embodiment, the component may interact with the user to define the intra-type and inter-type relationships between objects. The component may also define similarity functions that are not based recursively on the similarity between objects, such as similarity based search terms of a query. In block 201, the component selects the next type of object. In decision block 202, if all the types of objects have already been selected, then the component returns, else the component continues at block 203. In block 203, the component selects the next intra-type relationship for the selected type. In decision block 204, if all the intra-type relationships have already been selected, then the component continues at block 206, else the component continues at block 205. In block 205, the component defines an intra-type similarity function for the selected type and relationship. The component then loops to block 203 to select the next intra-type relationship. In block 206, the component selects the next inter-type relationship for the selected type. In decision block 207, if all the inter-type relationships have already been selected, then the component continues at block 209, else the component continues at block 208. In block 208, the component defines the inter-type similarity function for the selected type and relationship. The component then loops to block 206 to select the next inter-type relationship. In block 209, the component defines the overall similarity function by combining the defined intra-type similarity functions and inter-type similarity functions for the selected type. The component may apply weighting factors to each of the combined similarity functions. The component then loops to block 201 to select the next type of object.

Figure 3:
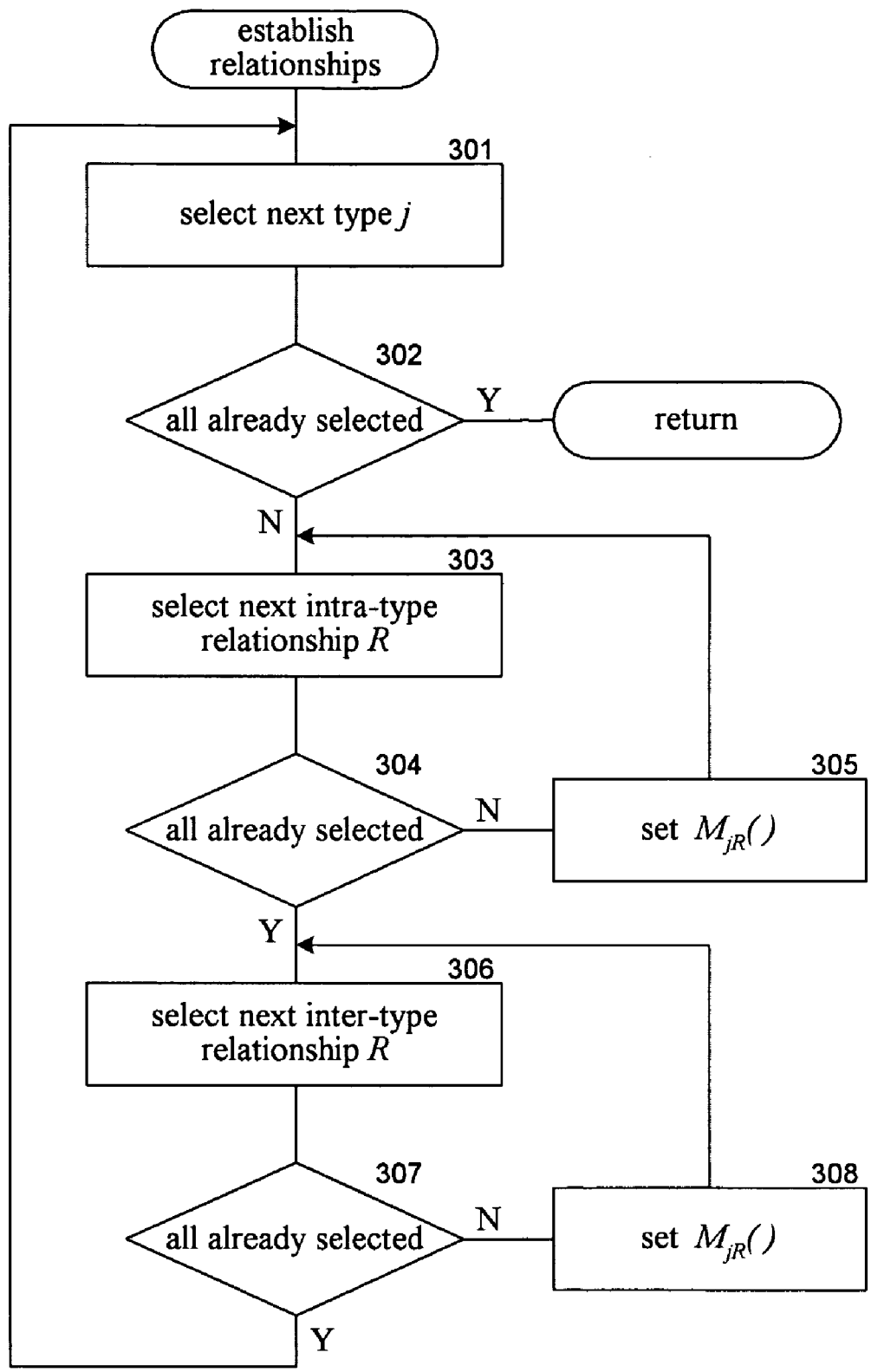
FIG. 3 is a flow diagram that illustrates the processing of the establish relationships component in one embodiment.

FIG. 3 is a flow diagram that illustrates the processing of the establish relationships component in one embodiment. The component processes the collected data and generates the relationship data. In blocks 301-308, the component loops selecting each type of object and generating the relationship data for that type of object. In block 301, the component selects the next type of object. In decision block 302, if all the types have already been selected, then the component returns, else the component continues at block 303. In block 303, the component selects the next intra-type relationship for the selected type. In decision block 304, if all the intra-type relationships have already been selected, then the component continues at block 306, else the component continues at block 305. In block 305, the component sets the elements of the relationship data for the selected type and selected intra-type relationship. The component then loops to block 303 to select the next intra-type relationship. In block 306, the component selects the next inter-type relationship for the selected type. In decision block 307, if all the inter-type relationships have already been selected, then the component loops to block 301 to select the next type of object, else the component continues at block 308. In block 308, the component sets the elements of the relationship data for the selected type and selected inter-relationship type. The component then loops to block 306 to select the next inter-type relationship for the selected type.

Figure 4:
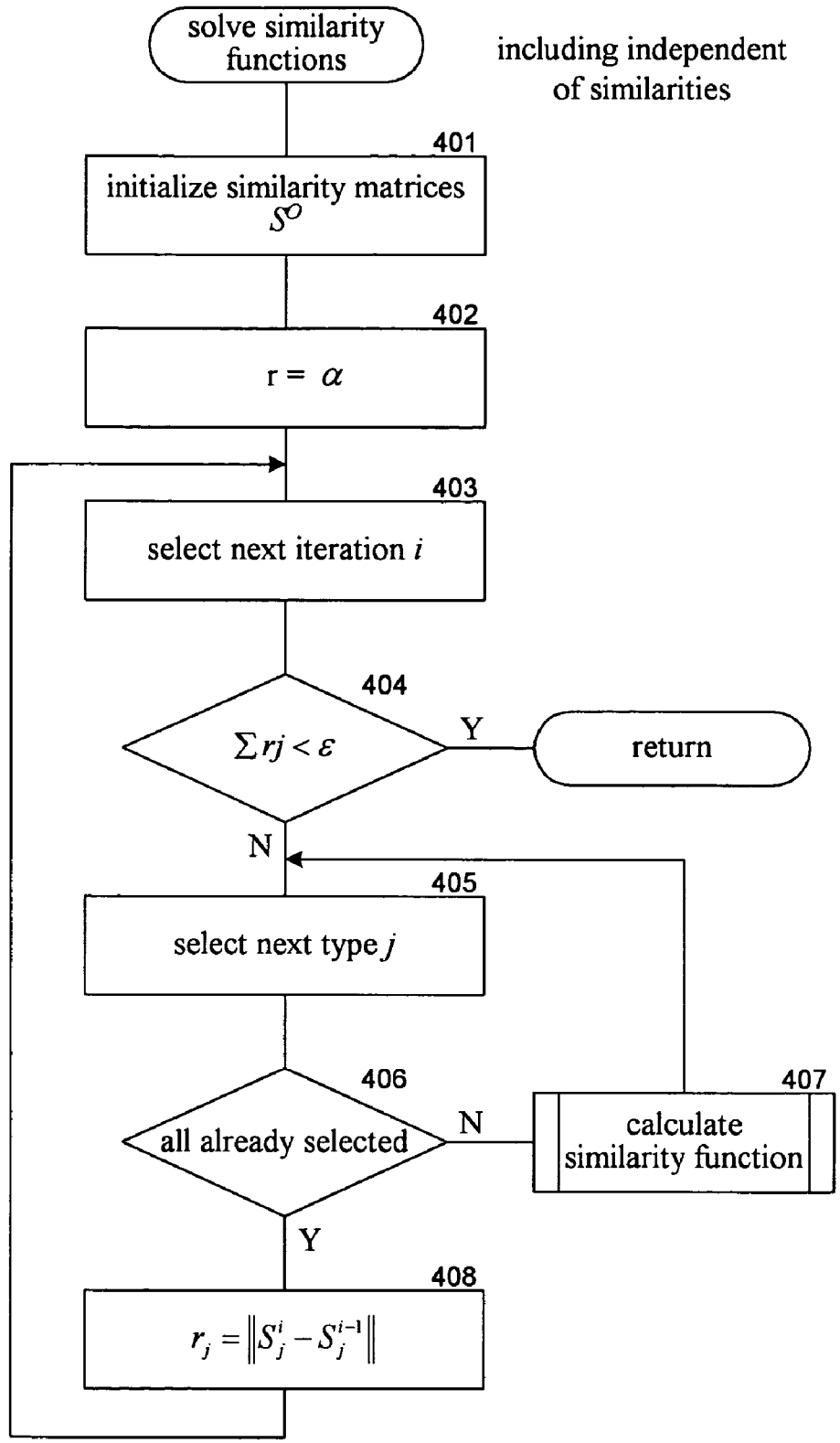
FIG. 4 is a flow diagram that illustrates the processing of the solve similarity functions component in one embodiment.

FIG. 4 is a flow diagram that illustrates the processing of the solve similarity functions component in one embodiment. In block 401, the component initializes the similarity matrices. For example, the component may set the similarity values of the diagonals to one to indicate maximal similarity and the other similarity values to random numbers. In block 402, the component sets a difference value to a very large number so that at least one iteration is performed. In blocks 403-408, the component loops calculating the overall similarity functions for multiple iterations to update the similarity matrices until the similarity values converge on a solution. In block 403, the component selects the next iteration. In decision block 404, if the sum of the difference values for the similarities of the types is less than a threshold difference, then the solution has converged and the component returns, else the component continues at block 405. In block 405, the component selects the next type of object. In decision block 406, if all the types have already been selected, then the component continues at block 408, else the component continues at block 407. In block 407, the component calculates the similarity function for the selected type to update the similarity matrix for the selected type and then loops to block 405 to select the next type. In block 408, the component calculates the difference between the similarity values of this iteration and the similarity values of the previous iteration for the selected type. The component then loops to block 403 to start the next iteration.

Figure 5:
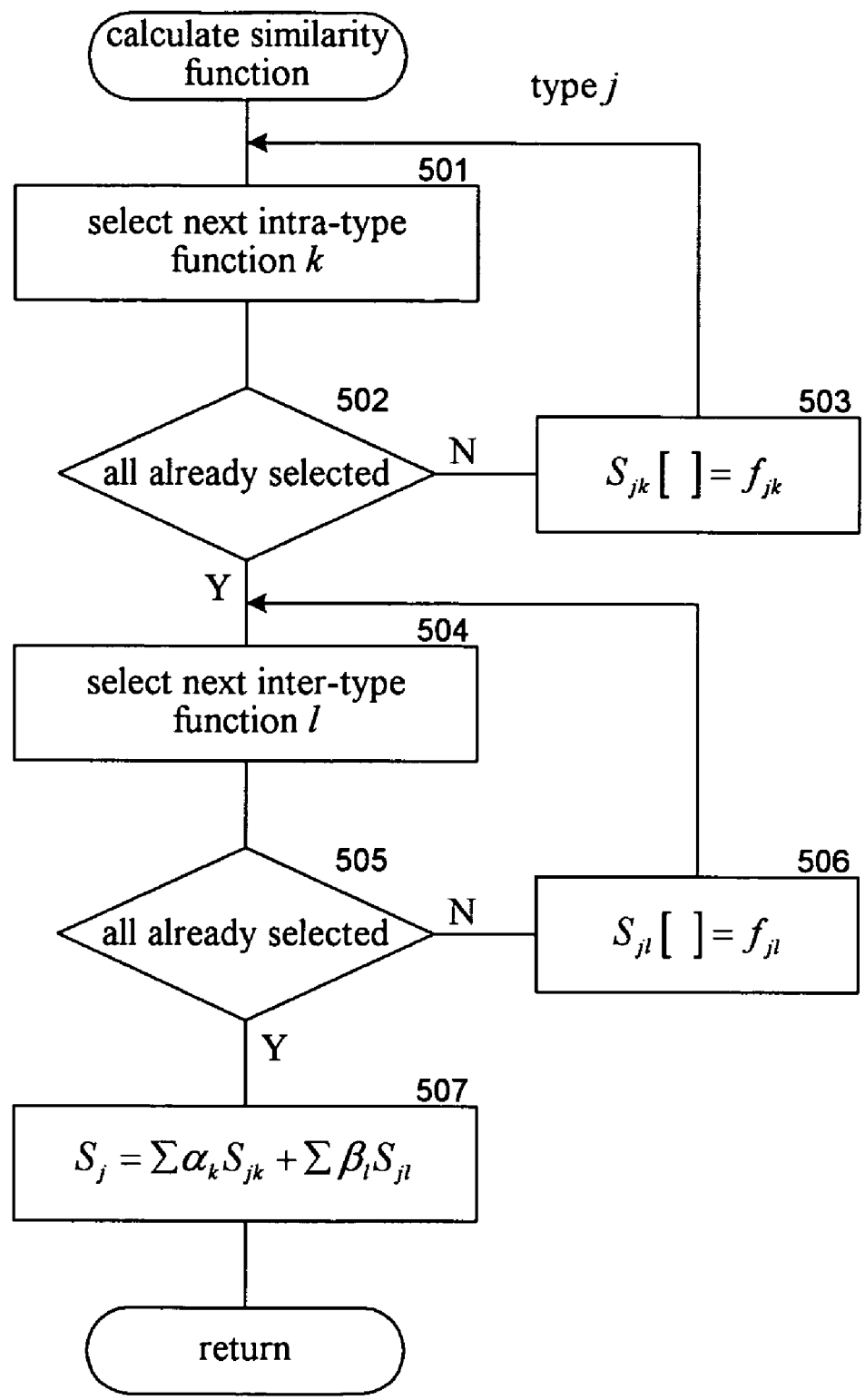
FIG. 5 is a flow diagram that illustrates the processing of the calculate similarities functions component in one embodiment.

FIG. 5 is a flow diagram that illustrates the processing of the calculate similarities component in one embodiment. The component is passed a type of object and updates the similarity matrices for that type. In block 501, the component selects the next intra-type similarity function for the passed type. In decision block 502, if all the intra-type similarity functions have already been selected, then the component continues at block 504, else the component continues at block 503. In block 503, the component calculates a new similarity value for each object of the passed type. The component then loops to block 501 to select the next intra-type similarity function. In block 504, the component selects the next inter-type similarity function for the passed type. In decision block 505, if all the inter-type similarity functions have already been selected, then the component continues at block 507, else the component continues at block 506. In block 506, the component calculates the new similarity values for each object of the passed type using the selected inter-type similarity function. The component then loops to block 504 to select the next inter-type similarity function. In block 507, the component combines the matrices using weights to generate an overall similarity for the passed type for the current iteration. The component then returns.

One skilled in the art will appreciate that although specific embodiments of the similarity system have been described herein for purposes of illustration, various modifications may be made without deviating from the spirit and scope of the invention. Accordingly, the invention is not limited except by the appended claims.

We claim:

1. A method in a computer system for generating measurements of similarity between objects, each object having one of a plurality of types, a type having an intra-type relationship, a pair of types having an inter-type relationship, the method comprising:

for each type,
when the similarity of that type is based on an intra-type relationship, providing an intra-type similarity function for each such relationship that measures the similarity between objects of that type;
when the similarity of that type is based on an inter-type relationship, providing an inter-type similarity function for each such relationship that measures the similarity between objects of that type based on the similarity of objects of another type, wherein the inter-type similarity function generates a similarity for first and second objects of that type that is a weighted average of the similarity between pairs of objects of the other type with one object of the pair having a relationship with the first object and the other object of the pair having a relationship with the second object; and
providing a similarity function that measures the similarity between objects of that type based on any intra-type similarity functions and any inter-type similarity functions for that type; and for each relationship, providing data that defines that relationship between objects associated with that relationship;

simultaneously solving the provided similarity functions based on the relationships defined by the provided data; and storing similarities based on simultaneous solving of the provided similarity functions.

2. The method of claim 1 wherein an intra-type similarity function for a type is defined recursively based on the similarity function of that type.

3. The method of claim 1 wherein an inter-type similarity function for a type is defined recursively based on the similarity function of another type.

4. The method of claim 1 wherein the similarity function for a type is a linear combination of intra-type and inter-type similarity functions for that type.

5. The method of claim 4 wherein each intra-type and inter-type similarity function is given a weight.

6. The method of claim 5 wherein the weights for the intra-type and inter-type similarity functions for that type sum to one.

7. The method of claim 1 wherein the similarity functions are solved by iteratively calculating similarities for the objects based on the similarity functions.

8. The method of claim 7 wherein the similarity functions are solved when a difference measure, based on the similarities from one iteration to a next iteration, converges.

9. The method of claim 7 wherein the similarity functions are solved when a difference measure, based on the similarities from one iteration to a next iteration, is less than a threshold difference.

10. The method of claim 1 wherein the types of objects include web pages and queries, and an inter-type relationship between a query and a web page is based on click throughs from a query to a web page.

11. The method of claim 1 wherein the types of objects include web pages and queries, intra-type relationships for web pages are based on incoming and outgoing links, and an inter-type relationship between a web page and a query is based on click throughs from a query to a web page.

12. A computer-readable medium containing instructions for controlling a computer system to generate measurements of similarity between objects, each object having one of a plurality of types, by a method comprising:

providing a similarity function for each type that measures the similarity between objects of that type based on intra-type similarities between objects of that type when an intra-type similarity is defined for that type and inter-type similarity between objects of that type based on the similarity of objects of another type when an inter-type similarity is defined for that type, wherein the inter-type similarity for first and second objects of that type is a weighted average of the intra-type similarity between pairs of objects of the other type with one object of the pair having a relationship with the first object and the other object of the pair having a relationship with the second object;

for each relationship, providing data that defines that relationship between objects associated with that relationship;

solving the provided similarity functions based on the relationships defined by the provided data; and storing similarities based on the solved similarity functions.

13. The computer-readable medium of claim 12 wherein the similarity functions define a set of linear equations.

14. The computer-readable medium of claim 12 wherein a similarity function is defined recursively based on the similarities of objects of a different type.

15. The computer-readable medium of claim 12 wherein a similarity function is defined recursively based on similarities of objects of that type for different relationships.

16. The computer-readable medium of claim 12 wherein the similarity function for a type is a linear combination of intra-type and inter-type similarities for that type.

17. The computer-readable medium of claim 16 wherein each intra-type and inter-type similarity is given a weight.

18. The computer-readable medium of claim 17 wherein the weights for the intra-type and inter-type similarities for that type sum to one.

19. The computer-readable medium of claim 12 wherein the similarity functions are solved by iteratively calculating similarities for the objects based on the similarity functions.

20. The computer-readable medium of claim 19 wherein the similarity functions are solved when a difference measure based on the similarities from one iteration to a next iteration converges.

21. The computer-readable medium of claim 19 wherein the similarity functions are solved when a difference measure based on the similarities from one iteration to a next iteration is less than a threshold difference.

22. A computing device for calculating a similarity score for objects, each object having one of a plurality of types and each type having an inter-type relationship with another type, the computing device comprising:

a component for each type that implements a similarity function that provides a similarity score for pairs of objects of that type based on inter-type similarity between objects of that type and objects of another type, the inter-type similarity being defined recursively based on the similarity score for pairs of objects of the other type and inter-type relationships between pairs of objects, wherein the inter-type similarity for first and second objects of that type is a weighted average of the intra-type similarity between pairs of objects of the other type with one object of the pair having a relationship with the first object and the other object of the pair having a relationship with the second object;

a component that solves the similarity functions based on the inter-type relationships defined for a set of objects by iteratively invoking the components that implement the similarity function until the similarity scores converge; and a component that stores similarities based on the solved similarity functions.

23. The computing device of claim 22 wherein the similarity functions define a set of linear equations.

24. The computing device of claim 22 wherein a type has an intra-type relationship between objects of that type and wherein the similarity function is further based on intra-type similarities between objects of that type based on intra-type relationships between the objects.

25. The computing device of claim 24 wherein an intra-type similarity for a type is based on inter-type similarities between objects of that type and another type.

26. The computing device of claim 24 wherein a similarity function is defined recursively based on intra-type similarities of objects for different intra-type relationships.

27. The computing device of claim 24 wherein the similarity function for a type is a linear combination of intra-type and inter-type similarity functions for that type.

28. The computing device of claim 27 wherein each intra-type and inter-type similarity function is given a weight.

29. The computing device of claim 28 wherein the weights for the intra-type and inter-type similarity functions for that type sum to one.

30. The computing device of claim 22 wherein the similarity scores converge when a difference measure based on the similarities from one iteration to a next iteration is less than a difference threshold.

31. The computing device of claim 22 wherein the similarity functions are solved when a difference measure based on the similarities from one iteration to a next iteration is less than a threshold difference.

* * * * *